United States Patent
Takagi (10) Patent No.: US 12,541,314 B2
(45) Date of Patent: Feb. 3, 2026

(54) INFORMATION PROCESSING APPARATUS, AND CONTROL METHOD FOR MANAGING LOG INFORMATION THAT PROVIDES A STORAGE FUNCTION CONNECTED TO A NETWORK

(71) Applicant: CANON KABUSHIKI KAISHA, Tokyo (JP)

(72) Inventor: Noriko Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/645,197

(22) Filed: Apr. 24, 2024

(65) Prior Publication Data

US 2024/0361932 A1    Oct. 31, 2024

(30) Foreign Application Priority Data

Apr. 28, 2023  (JP) ................................. 2023-074227

(51) Int. Cl.
*G06F 3/06* (2006.01)

(52) U.S. Cl.
CPC .......... *G06F 3/0635* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 8,352,426 B2* | 1/2013 | Saika | G06F 3/067 707/622 |
| 2019/0004759 A1* | 1/2019 | Niimoto | G06F 3/1273 |
| 2019/0332312 A1* | 10/2019 | Hayashi | G06F 3/0688 |
| 2021/0081129 A1* | 3/2021 | Tian | G06F 3/0685 |
| 2022/0414246 A1* | 12/2022 | Passey | G06F 21/6218 |

FOREIGN PATENT DOCUMENTS

JP    2006330791 A    12/2006

* cited by examiner

*Primary Examiner* — Ryan Bertram
*Assistant Examiner* — Edmund H Kwong
(74) *Attorney, Agent, or Firm* — Canon U.S.A., Inc. IP Division

(57) ABSTRACT

An information processing apparatus includes a storage device and is configured to output a notification message in response to available space of a log storage area of the storage device falling below a predetermined amount due to log information stored in the storage device, to set a first setting for transferring the log information stored in the log storage area to an external log server over a network and a second setting for creating a link for referring to the log information stored in the log storage area, and to perform control, in accordance with log transfer in accordance with the first setting and link creation in accordance with the second setting, so that a history record of a file operation is not stored as the log information in the log storage area.

6 Claims, 9 Drawing Sheets

801 — LOG TRANSFER DESTINATION SETTING
- ◉ ENABLE
  - LOG SERVER INFORMATION  [123.456.7.8]
- ○ DISABLE

802 — LOG LINK CREATION SETTING
- ○ ENABLE
  - CREATE LINK TO  [          ]
- ◉ DISABLE

803 — LOG STORAGE SETTING
- STORAGE PERIOD  [365]  DAYS
- LOG FILE SIZE  [100]  MB

804 — AUTOMATIC LOG DELETION SETTING
- ◉ ENABLE
- ○ DISABLE

INFORMATION PROCESSING APPARATUS, AND CONTROL METHOD FOR MANAGING LOG INFORMATION THAT PROVIDES A STORAGE FUNCTION CONNECTED TO A NETWORK

BACKGROUND

Field of the Disclosure

The present disclosure relates to a technique for managing log information in an information processing apparatus that provides a storage function connected to a network.

Description of the Related Art

Information processing apparatuses, such as network attached storage (NAS) apparatuses, have been widely used that have a log management function of recording and storing, as log information, a history of file operations performed on files in the information processing apparatuses.

The log management function enables output of the log information or link information about the link to the log information to a shared folder or the like to allow other client personal computers (PCs) to refer to the log information.

Further, the log management function is capable of transferring the log information to an external log server, such as a system logging protocol (syslog) server or a rocket-fast system for log processing (rsyslog) server. Syslog and rsyslog are standards for log data transfer over networks.

There is a technique described in Japanese Patent Application Laid-Open No. 2006-330791 regarding a function of transferring a log to an external log server. In Japanese Patent Application Laid-Open No. 2006-330791, when a client apparatus and a log server are not connected over a network, a log is stored in the client apparatus. When a connection is established, the log stored in the client apparatus is transmitted to the log server.

The foregoing log management function involves an upper limit to the data size of a storage area in which log information can be stored. Thus, in a case where the frequency of file operations on files in the information processing apparatus is high, the data size of history information to be stored may exceed the upper limit. To address this, in order to prompt an administrator of the information processing apparatus to manually delete or move log information, a warning message can be displayed on a display of the information processing apparatus when a free space of a log storage area falls below a predetermined amount. In addition, in a case where the free space of the log storage area is exhausted, an old history record can be automatically deleted and a new history record can be stored as a piece of the log information. However, even in the latter case, the administrator may need to check the details of the old history record to determine whether deletion thereof is acceptable. In a case where the data size of the free space is approaching the upper limit, deletion is to be performed in the near future and the deadline for completing the check is approaching, but the check work in such a case can be especially very time-consuming for the administrator.

The history records that have been each recorded as log information include those that do not need to be kept after being recorded. Avoiding storage of data on such history records more than necessary may prevent the upper limit from being exceeded, in the first place.

History records can be unnecessary to be kept, for example, in a case where a setting of transferring a log to a log server is made. This setting is based on the assumption that an operation of centrally managing logs of a plurality of information processing apparatuses in an external log server is performed, and there is presumably no need to store log information in the information processing apparatus for a long period of time with this setting enabled.

In addition, history records can be unnecessary to be kept, for example, in a case where a reference setting of referring to the log information stored in the information processing apparatus from other client PCs is not made. This is because, with the foregoing premise that the logs are centrally managed by the log server and with the reference setting not being made, it is presumably unnecessary to individually access the information processing apparatus to check the stored log information.

Furthermore, history records can be unnecessary to be kept, for example, in a case where the log transfer to the log server has succeeded. Here, even with the setting of the log transfer to the log server made, the log information on which the transfer processing has failed is presumably to be stored in the information processing apparatus.

SUMMARY

According to an aspect of the present disclosure, an information processing apparatus includes a storage device, wherein a history record of a file operation performed over a network on a file is stored as log information in a log storage area in the storage device, one or more memories storing instructions, and one or more processors capable of executing the instructions causing the information processing apparatus to output a notification message in response to available space of the log storage area falling below a predetermined amount due to the log information stored in the storage device, set a first setting for transferring the log information stored in the log storage area to an external log server over a network and a second setting for creating a link for referring to the log information stored in the log storage area; and perform control, in accordance with log transfer in accordance with the first setting and link creation in accordance with the second setting, so that log data corresponding to the history record of the file operation is not stored as the log information in the log storage area.

Further features of the present disclosure will become apparent from the following description of exemplary embodiments with reference to the attached drawings.

DESCRIPTION OF THE EMBODIMENTS

Hereinafter, exemplary embodiments for implementing the present disclosure will be described with reference to the accompanying drawings.

Figure 1:
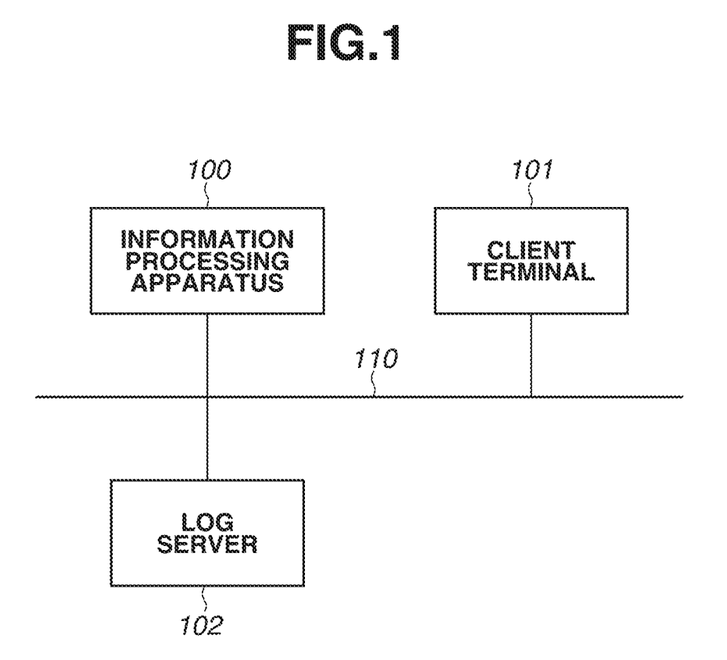
FIG. 1 is a block diagram illustrating an example of an overall configuration of a system.

A first exemplary embodiment of the present disclosure will be described. FIG. 1 is a block diagram illustrating an example of an overall configuration of a system according to the present exemplary embodiment. The system includes an information processing apparatus 100, a client terminal 101, and a log server 102, all of which are connected to a network 110 and are mutually communicable. While FIG. 1 illustrates one information processing apparatus 100, one client terminal 101, and one log server 102 in the present exemplary embodiment, a plurality of information processing apparatuses 100, a plurality of log servers 102, and a plurality of log servers 102 are connected to the network 110 in some embodiments.

The information processing apparatus 100 provides a storage function connected to the network 110, and is, for example, a network attached storage (NAS). The information processing apparatus 100 has a file sharing function and a log function of detecting an operation performed on a file system, recording the detected operation as a history record, and storing it as a piece of log information. The file sharing function includes creation and access right management of a shared folder and file operations, such as generation, editing, and deletion of a file.

The client terminal 101 is used by a user to perform a file operation on the information processing apparatus 100.

The log server 102 has a function of receiving a plurality of pieces of log information from various information devices and centrally managing the plurality of pieces of log information. Examples of the log server 102 include a system logging protocol (syslog) server and a rocket-fast system for log processing (rsyslog) server that receive log messages over the network 110. In the present exemplary embodiment, the log server 102 receives log information, such as a file operation log, from the information processing apparatus 100 and accumulates a plurality of pieces of the received log information, for example. An administrator can check the accumulated log information and monitor abnormal accesses to files.

Figure 2:
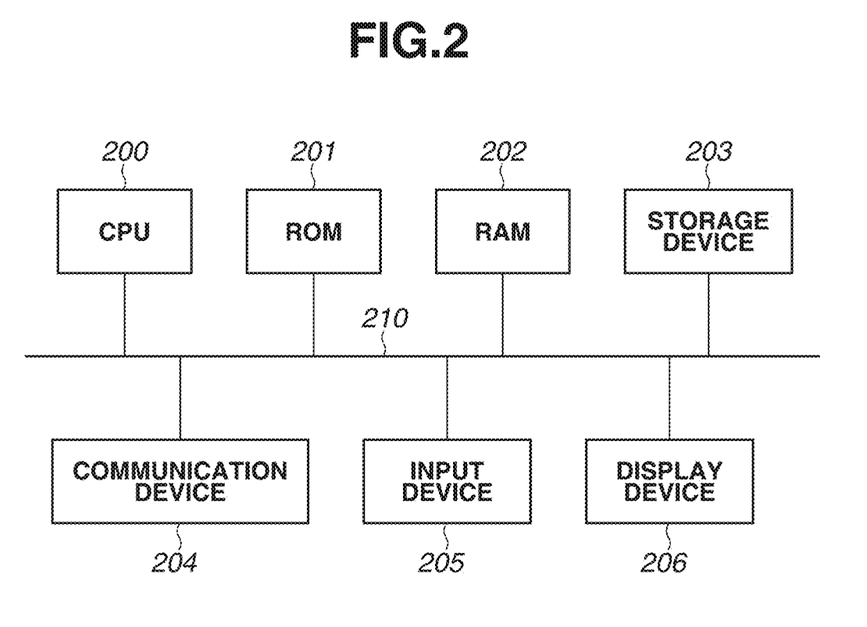
FIG. 2 is a block diagram illustrating an example of a hardware configuration of an information processing apparatus.

FIG. 2 is a block diagram illustrating an example of a hardware configuration of the information processing apparatus 100 illustrated in FIG. 1. In addition to the information processing apparatus 100 according to the present exemplary embodiment, the client terminal 101 and the log server 102 can adopt a hardware configuration of a general information processing apparatus as illustrated in FIG. 2.

A central processing unit (CPU) 200 controls the overall operation by reading control programs stored in a read only memory (ROM) 201 and executing various processes. A random access memory (RAM) 202 is used as a main memory for the CPU 200 and a temporary storage area, such as a work area for the CPU 200. A storage device 203 is a large-capacity storage unit that stores files and various programs to be operated from the client terminal 101. A partial storage area of the storage device 203 is provided to the outside as storage service over a network 210. The partial storage area of the storage device 203 also stores log information. A communication device 204 is an interface for connecting the information processing apparatus 100 to the Internet. The CPU 200 receives a file operation performed with the client terminal 101 via the communication device 204.

A display device 206 displays the state of the information processing apparatus 100 among various types of information. The display device 206 further displays a setting screen for receiving an instruction from the user. The display device 206 is also capable of displaying a warning message when a free space (available space) of a log storage area falls below a predetermined amount. The user inputs characters and/or data using an input device 205, such as a keyboard or a mouse, to perform a setting instruction and a file operation on the information processing apparatus 100.

Figure 3:
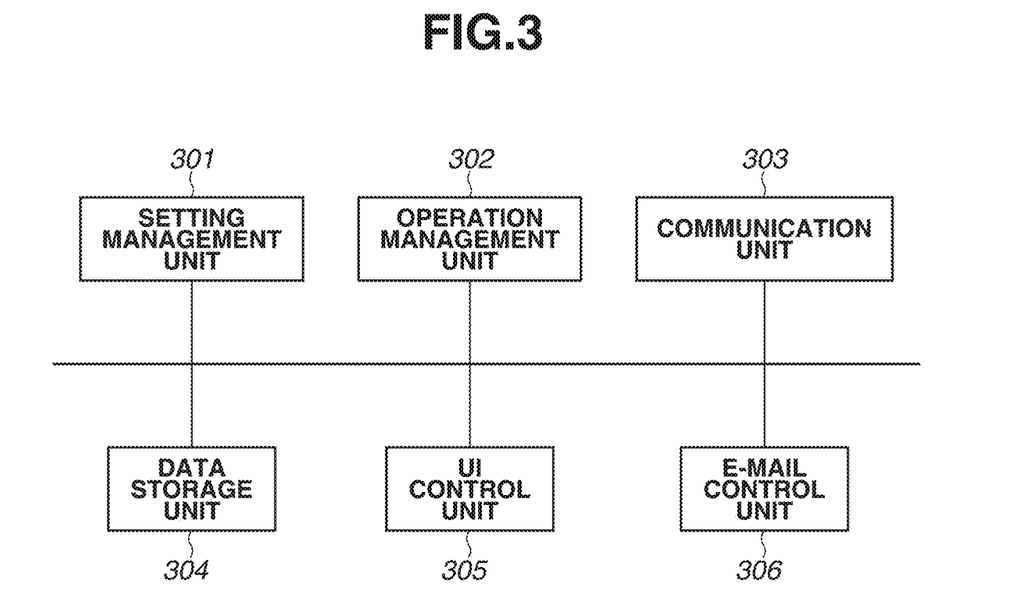
FIG. 3 is a block diagram illustrating an example of a software configuration of the information processing apparatus.

FIG. 3 is a block diagram illustrating an example of a software configuration of the information processing apparatus 100 according to the first exemplary embodiment. The software configuration illustrated in FIG. 3 is realized by, for example, the CPU 200 reading a program stored in the ROM 201 to the RAM 202 and executing the program.

Figure 5A:
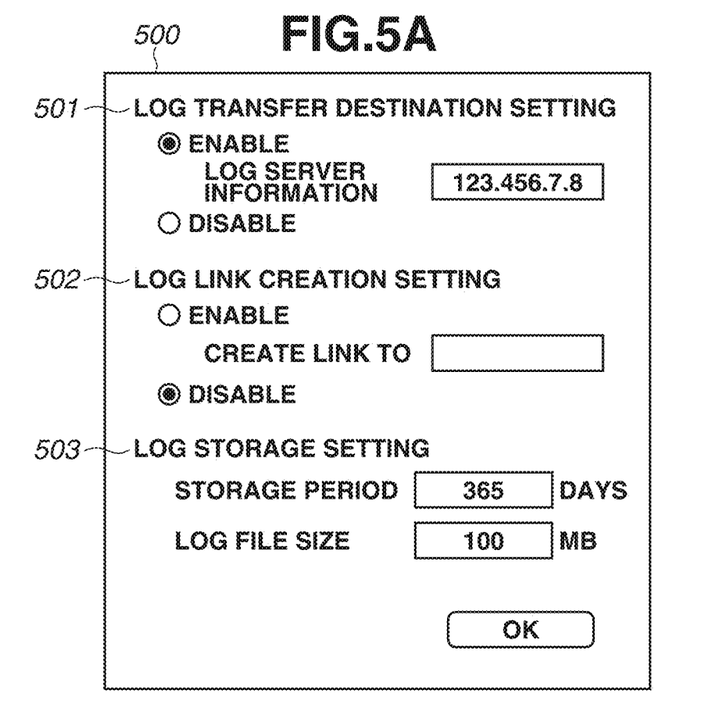
FIGS. 5A and 5B illustrate examples of an initial setting screen and a management screen, respectively, according to one or more aspects of the present disclosure.

A setting management unit 301 stores values of settings relating to various functions of the information processing apparatus 100 in a given storage device, such as the RAM 202 or the storage device 203, and reads the values of settings from the storage device. Here, examples of the settings include a setting of a location at which a file is stored and shared (such a location is hereinafter referred to as a shared folder). The settings also include settings of a storage period and/or a log file size of log information, a transfer destination of log information, and link information to log information, which are illustrated in FIG. 5A.

An operation management unit 302 detects a file operation on a file in the information processing apparatus 100, generates a history record indicating the time and details of the detected operation, and stores the history record as log information in a predetermined storage destination. In some embodiments, the storage destination is a fixed folder of the storage device 203 in the information processing apparatus 100. In other embodiments, a storage destination setting (not illustrated) of the log information is obtained from the setting management unit 301. In yet other embodiments, the storage destination is located in a database or the like. The operation management unit 302 has also a function of automatically deleting (some of) the log information stored in the log storage area in accordance with predetermined conditions regarding an upper limit of a file size of a storage file at the storage destination, a maximum storable size of a storage area, a storable period, and/or the like.

A communication unit 303 communicates with, for example, the client terminal 101 and the log server 102 to realize reception of file operations and the like and transmission of log information.

A data storage unit 304 stores setting values and files in the storage device 203 in response to requests from the setting management unit 301 or the client terminal 101. A file is stored in, for example, a shared folder that is operable from the client terminal 101.

A user interface (UI) control unit 305 displays screens on the display device 206 in response to requests from the user or the setting management unit 301. For example, the UI control unit 305 displays an initial setting screen 500 and a management screen 510 illustrated in FIGS. 5A and 5B, respectively. The UI control unit 305 further displays a screen for setting an e-mail transmission destination (not illustrated) on the display device 206, and stores setting values designated via the setting management unit 301 in a given storage device. An e-mail control unit 306 transmits an e-mail to an e-mail address designated in advance by the user in response to a request from the setting management unit 301 or the operation management unit 302. In some embodiments, users who are allowed to access the shared folder of the information processing apparatus 100 are restricted using an authentication function (including an external authentication service, which is not illustrated).

Figure 4:
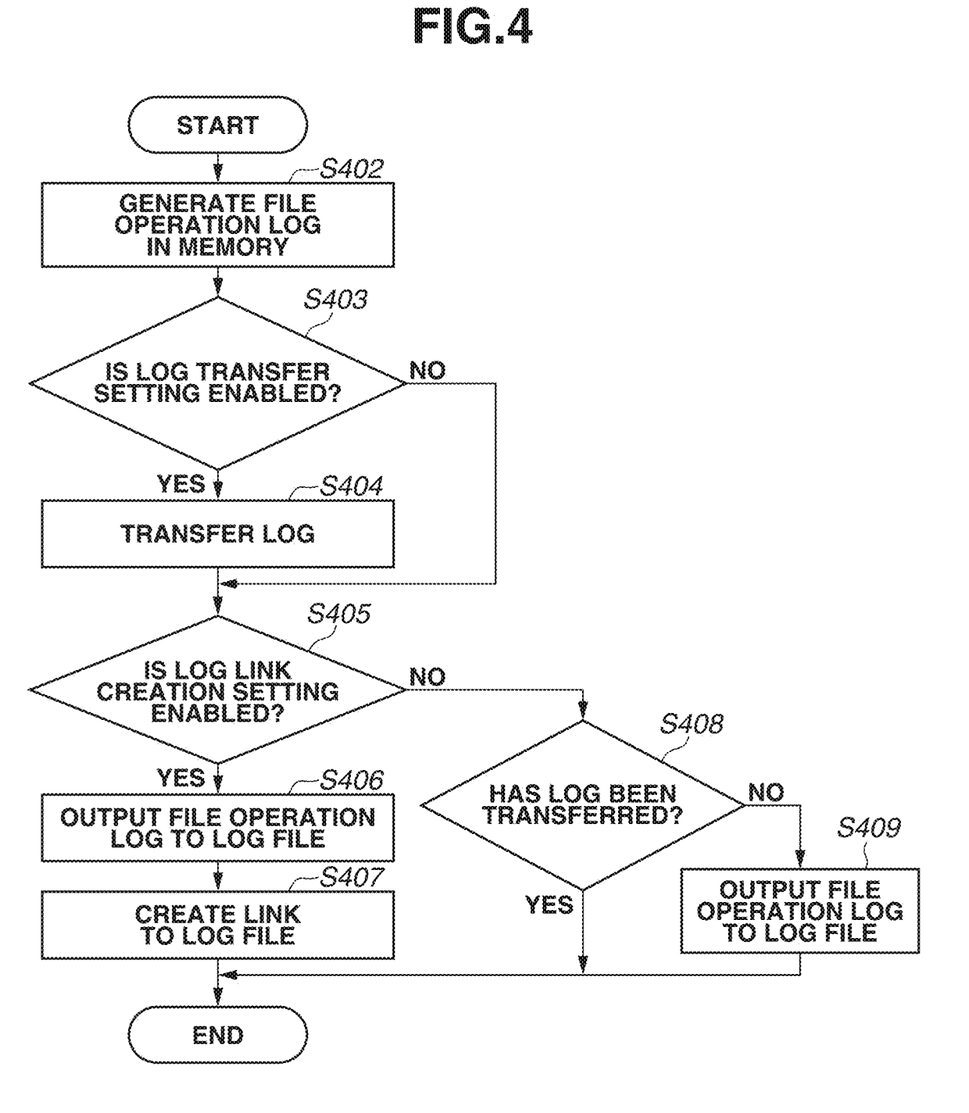
FIG. 4 is a flowchart illustrating processing relating to log storage according to one or more aspects of the present disclosure.

FIG. 4 is a flowchart illustrating processing relating to log storage in a case where the operation management unit 302 of the information processing apparatus 100 according to the present exemplary embodiment detects a file operation. The steps each indicate an operation realized by the CPU 200 executing the program.

Figure 5B:
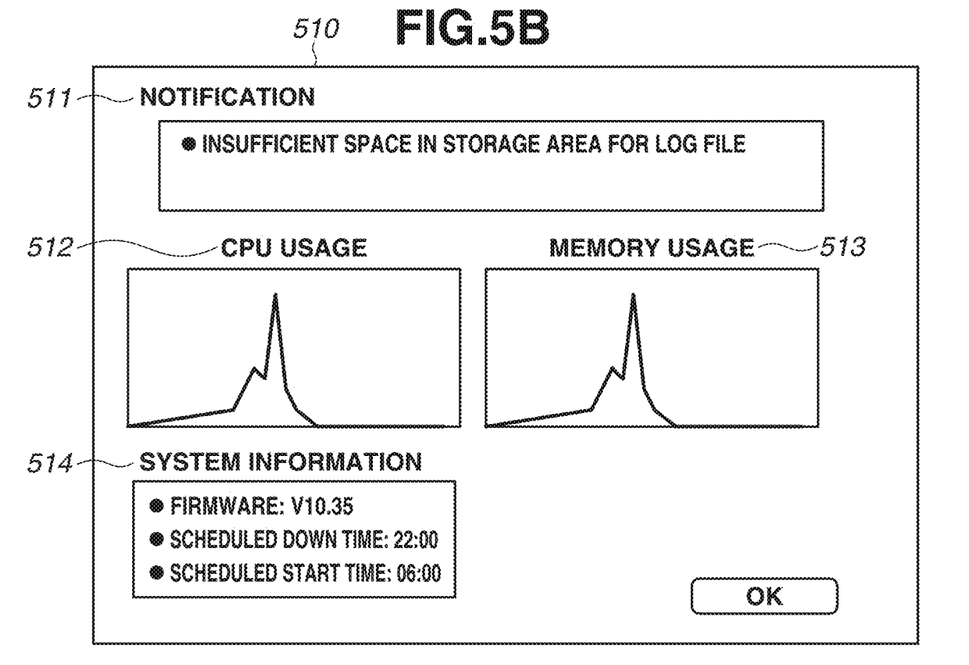

FIGS. 5A and 5B illustrate examples of the initial setting screen 500 and the management screen 510, respectively, relating to log storage provided by the information processing apparatus 100. The UI control unit 305 of the information processing apparatus 100 provides a screen to a web browser using a web server function. The setting items relating to the log storage illustrated in the initial setting screen 500 are set in advance as initial settings of the information processing apparatus 100.

The processing illustrated in FIG. 4 is executed in a case where the operation management unit 302 of the information processing apparatus 100 detects a file operation on a shared folder that is set in advance based on a request from the client terminal 101 or the like.

In step S402, the operation management unit 302 generates a log indicating a history record including the date and time and the details of the detected file operation, and stores the log in the RAM 202.

In step S403, the operation management unit 302 obtains setting information from the setting management unit 301 and checks whether a log transfer destination setting is enabled. More specifically, the operation management unit 302 checks whether a radio button "enable" is selected in a "log transfer destination setting" 501 in FIG. 5A. In step S403, if the radio button "enable" of the "log transfer destination setting" 501 is selected (YES in step S403), the processing proceeds to step S404. If the "log transfer destination setting" 501 is disabled (NO in step S403), the processing proceeds to step S405.

In a case where the radio button "enable" is selected in the "log transfer destination setting" 501 in performing the settings in advance in the initial setting screen 500 in FIG. 5A, the CPU 200 checks an input in a "log server information" field indicating a transfer destination when an "OK" button is pressed. This ensures that the transfer destination is always designated with the "log transfer destination setting" 501 enabled. The value to be designated in the "log server information" field in the "log transfer destination setting" 501 is, for example, the Internet Protocol (IP) address of the log server 102. Thus, the operation management unit 302 is able to check only the value associated with the selected radio button in step S403.

In step S404, the operation management unit 302 transfers data including the log stored in the RAM 202 in step S402 to the destination designated in the "log server information" field in the "log transfer destination setting" 501 via the communication unit 303. In addition, the operation management unit 302 stores, in the RAM 202 or other storages, information indicating whether the log transfer has been performed and a result of the log transfer (information indicating success or failure) via the communication unit 303. In some embodiments, the log stored in the RAM 202 in step S402 is converted into a format supportable at the destination and then the resulting log is transferred, or the log to be transferred is stored in a transfer file.

In step S405, the operation management unit 302 obtains setting information from the setting management unit 301 and checks whether a log link creation setting is enabled. Specifically, the operation management unit 302 checks whether a radio button "enable" is selected in the "log link creation setting" 502 in FIG. 5A.

In step S405, if the "log link creation setting" 502 is enabled (YES in step S405), the processing proceeds to step S406. If the "log link creation setting" 502 is disabled (NO in step S405), the processing proceeds to step S408.

In a case where the user selects the radio button "enable" in the "log link creation setting" 502 in performing the settings in advance in the initial setting screen 500 in FIG. 5A, the CPU 201 checks an input in a "create link to" field when the user presses an "OK" button. This ensures that the link destination is always designated with the "log link creation setting" 502 enabled. In step S405, the operation management unit 302 is able to check only the value associated with the selected radio button.

In step S406, the operation management unit 302 outputs log data (log) recorded in the RAM 202 in step S402 to a log file as one record of log information via the data storage unit 304. This enables the CPU 200 to store the file operation log as one record of the log information in the storage device 203 in the information processing apparatus 100. In step S407, the operation management unit 302 creates a link to the record of the log information output in step S406 in the shared folder designated in the "create link to" field of the "log link creation setting" 502 via the data storage unit 304. This link enables the user to check details recorded in the log from the client terminal 101 over the network 110.

In step S408, the operation management unit 302 checks whether the log data recorded in the RAM 202 in step S402 has been transferred in step S404, or checks information indicating the success or failure of the transfer. Here, if the log transfer has not been executed or the log transfer has failed (NO in step S408), the processing proceeds to step S409. In step S409, the operation management unit 302 outputs the log data recorded in the RAM 202 in step S402 to the log file as one record of the log information via the data storage unit 304. Here, if the log transfer has been executed or the log transfer has succeeded (YES in step S408), the processing ends.

Here, the management screen 510 is designed to be periodically referred to by the administrator of the information processing apparatus 100 in this exemplary embodiment. Thus, the management screen 510 is configured so that the administrator can check the state of the entire system of the information processing apparatus 100. For example, the management screen 510 displays "CPU usage" 512, "memory usage" 513, and "system information" 514 regarding the information processing apparatus 100.

In a case where the free space of the storage area (log storage area) allocated in the storage device 203 for the log information falls below the predetermined amount due to the log storage in step S406 or step S409, in some embodiments, the UI control unit 305 displays, on the management screen 510, a notification indicating the shortage of the free space of the log storage area. For example, the "notification" 511 displays a message "insufficient space in storage area for log file". This notification is output for the administrator of the information processing apparatus 100.

In other embodiments, in a case where the free space of the log storage area falls below the predetermined amount in step S406 or step S409, the e-mail control unit 306 transmits an e-mail to an e-mail address designated in a preset setting (not illustrated). This configuration enables the administrator of the information processing apparatus 100 to be notified of the shortage of the free space of the log storage area even by e-mail.

In yet other embodiments, in a case where the free space of the log storage area is exhausted due to the log storage in step S406 or step S409, the log storage in step S406 or step S409 is performed after the log data corresponding to the oldest history record in the records stored as the log information is deleted. Here, when the log is stored in the log storage area, the log is written in the log file. The upper limit of the file size of the log file is, for example, the "log file size" indicated in the "log storage setting" 503 in FIG. 5A. In the "log storage setting" 503, a "storage period" during which log data is stored in the information processing apparatus 100 can be designated, and past log information with storage period having elapsed can be automatically deleted.

A second exemplary embodiment of the present disclosure will be described. In the second exemplary embodiment, a description will be provided of an example in which a log is stored in the information processing apparatus 100 and then an unnecessary log is deleted from the log file. Here, the unnecessary log indicates a log that have been transmitted to the log server 102 and is not to be referred to from other client personal computers (PCs) (the log link creation setting is invalid).

In the second exemplary embodiment, configurations and processes not particularly specified are similar to those in the first exemplary embodiment.

Figure 6:
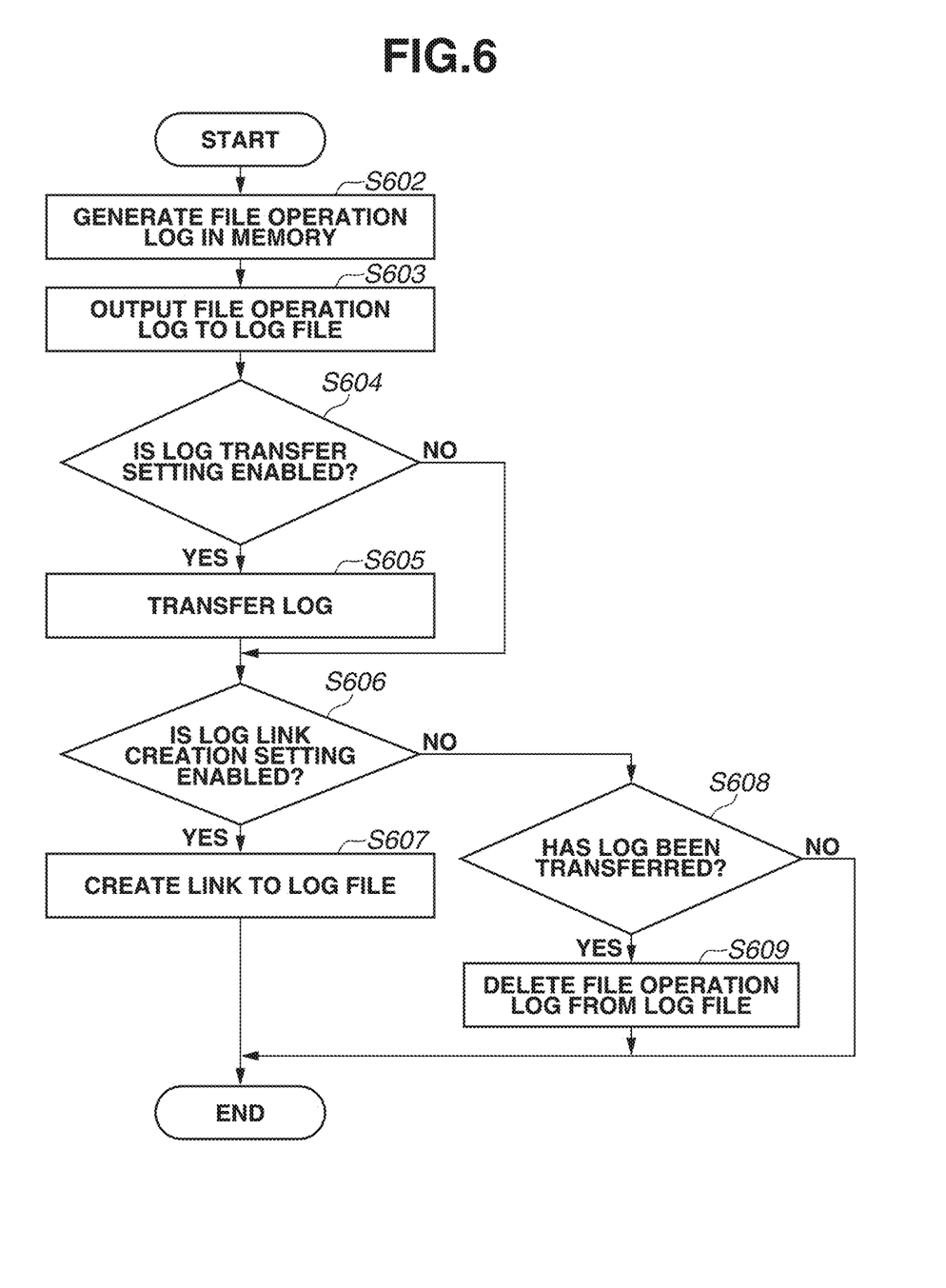
FIG. 6 is a flowchart illustrating processing relating to log storage according to one or more aspects of the present disclosure.

FIG. 6 is a flowchart illustrating processing relating to log storage in the second exemplary embodiment. Differences from the flowchart in FIG. 4 will be mainly described.

The processing illustrated in FIG. 6 is executed also in a case where the operation management unit 302 of the information processing apparatus 100 detects a file operation on a shared folder set in advance based on a request from the client terminal 101 or other devices.

In step S602, the operation management unit 302 generates a log indicating a history record including the date and time and the details of the detected file operation, and stores the log in the RAM 202. In step S603, as in step S406 and step S409, the operation management unit 302 outputs the log data recorded in the RAM 202 in step S602 to a log file as one record of log information via the data storage unit 304. This enables the storage device 203 in the information processing apparatus 100 to store therein the log of the file operation as one record of the log information.

In steps S604 and S605, operations similar to those in steps S403 and S404 are performed. In steps S606 and S607, operations similar to those in steps S405 and step S407 are performed.

In step S607, the operation management unit 302 creates a link to the record of the log information in the shared folder designated in the "create link to" field of the "log link creation setting" 502 via the data storage unit 304. This link enables the user to check the details recorded in the log from the client terminal 101 over the network 110.

In step S608, an operation similar to that in step S408 is performed. In step S608, if the operation management unit 302 determines that the log transfer has been performed or the log transfer has succeeded (YES in step S608), the processing proceeds to step S609. In step S609, the operation management unit 302 deletes the log data stored in step S603 via the data storage unit 304.

A third exemplary embodiment of the present disclosure will be described. As the third exemplary embodiment, a description will be provided of an embodiment that makes it possible for a user to specify enabling or disabling automatic deletion of log data in advance, in addition to the processes described in the first and second exemplary embodiments. Configurations and processes not particularly specified are all similar to those in the first and second exemplary embodiments.

Figure 7:
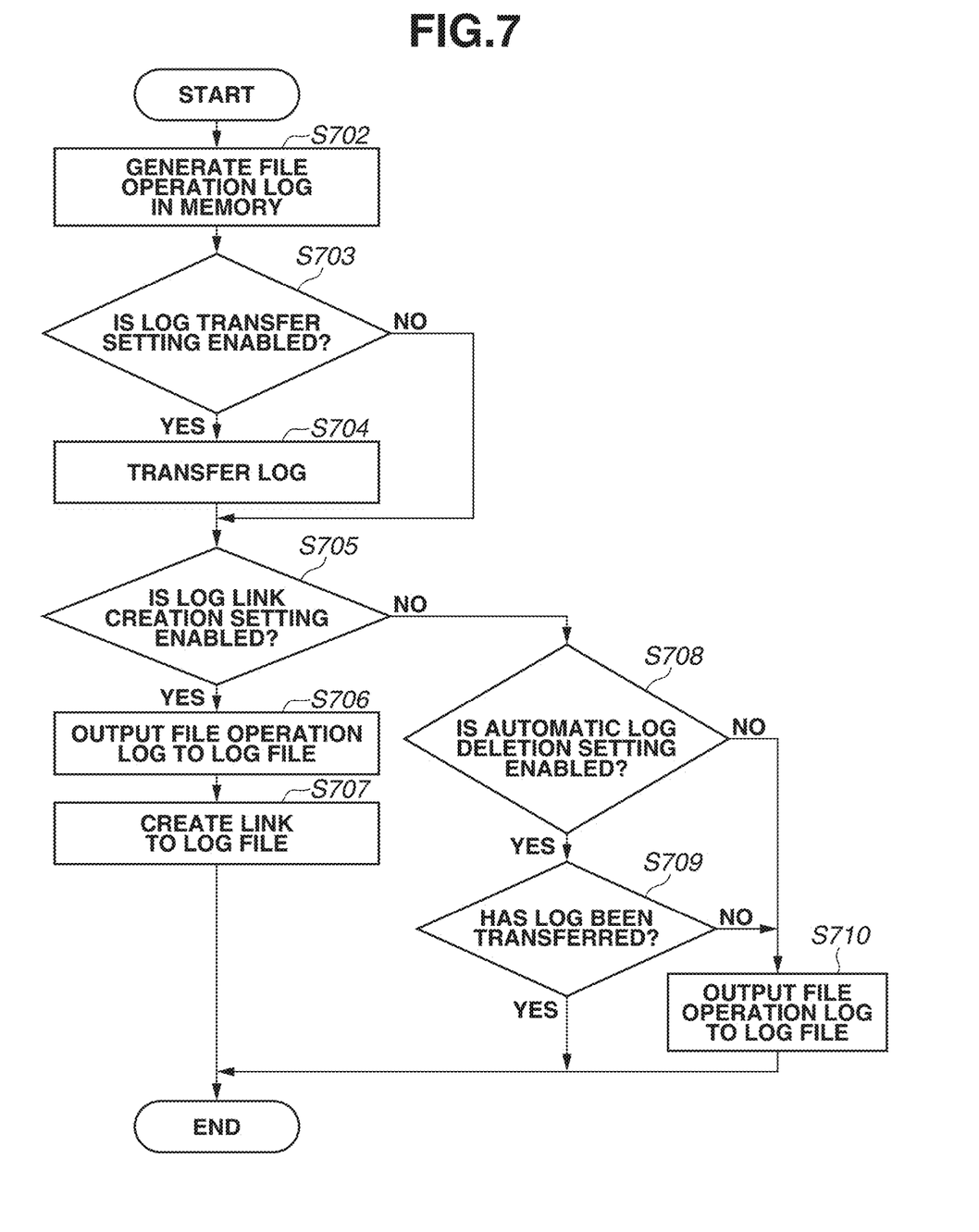
FIG. 7 is a flowchart illustrating processing relating to log storage according to one or more aspects of the present disclosure.

FIG. 7 is a flowchart illustrating processing relating to log storage according to the third exemplary embodiment. Differences from the flowchart in FIG. 4 will be mainly described. The processing illustrated in FIG. 7 is performed also in a case where the operation management unit 302 of the information processing apparatus 100 detects a file operation on a shared folder set in advance based on a request from the client terminal 101 or other devices. An example of an initial setting screen for log storage according to the present exemplary embodiment will be described with reference to FIG. 8.

Figure 8:
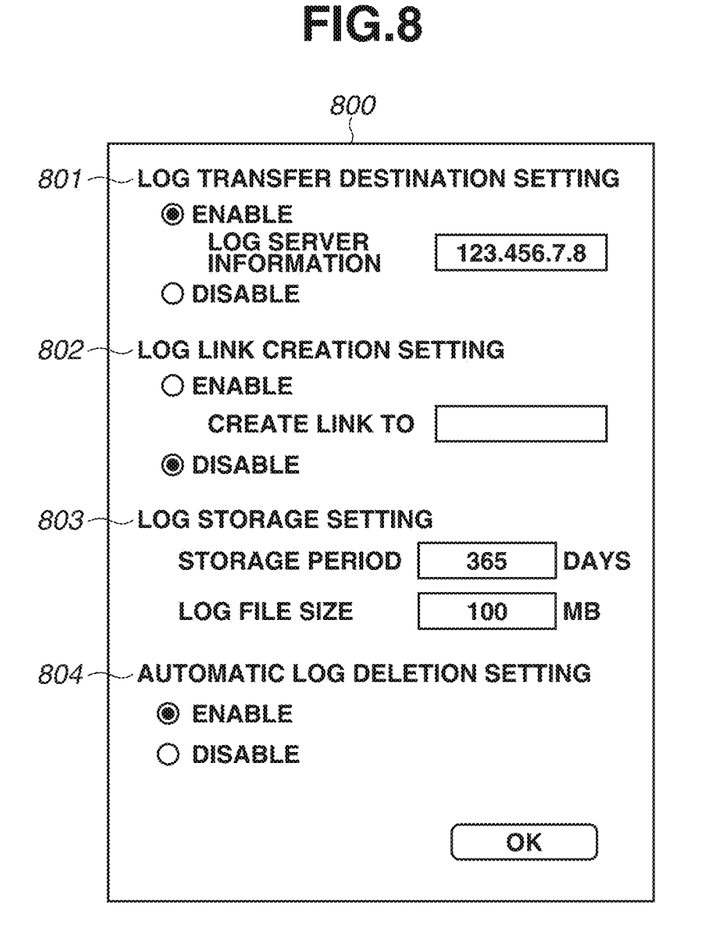
FIG. 8 illustrates an example of an initial setting screen according to one or more aspects of the present disclosure.

Setting items 801 to 803 in a setting screen 800 illustrated in FIG. 8 are equivalent to the setting items 501 to 503 described in conjunction with FIG. 5A, and thus descriptions thereof will be omitted. In the setting screen 800, in a case where a radio button "enable" is selected in a "log transfer destination setting" 801 and a radio button "disable" is selected in a "log link creation setting" 802, radio buttons in an "automatic log deletion setting" 804 are made selectable. The "automatic log deletion setting" 804 allows the user to select enabling or disabling a function of automatically deleting log data in a case where conditions described below in conjunction with FIG. 7 are satisfied.

The operations in steps S702 to S707 are similar to those in steps S402 to S407 in FIG. 4, and thus descriptions thereof will be omitted.

In step S708, the operation management unit 302 obtains setting information from the setting management unit 301, and checks whether an automatic log deletion setting is enabled in accordance with the specification made in the "automatic log deletion setting" 804. In step S708, if the operation management unit 302 determines that the automatic log deletion setting is enabled (YES in step S708), the processing proceeds to step S709. If the operation management unit 302 determines that the automatic log deletion setting is disabled (NO in step S708), the processing proceeds to step S710. In steps S709 to S710, operations similar to those in steps S408 to S409 are performed.

Thus, the configuration according to the present exemplary embodiment enables the user's intention to automatically delete a log to be checked.

First Modification of Third Exemplary Embodiment

In the above description, the differences between the third exemplary embodiment and the first exemplary embodiment have been described. The third exemplary embodiment is applicable also to the second exemplary embodiment. In such a case, an operation equivalent to that in step S708 is performed immediately before step S608 illustrated in FIG. 6.

The deletion operation in step S609 may be automatically performed in a case where the radio buttons "enable" are selected in the "log transfer destination setting" 801 and the "automatic log deletion setting" 804 and it is determined that the log transfer is successful.

Second Modification of Third Exemplary Embodiment

In a case where a radio button "disable" of the "log link creation setting" 802 on the setting screen 800 illustrated in FIG. 8 is selected, a radio button ("enable" or "disable") of the "automatic log deletion setting" 804 may be selectable.

A fourth exemplary embodiment of the present disclosure will be described. The present exemplary embodiment exemplifies a case where a link to log information is displayed on a management screen.

Figure 9:
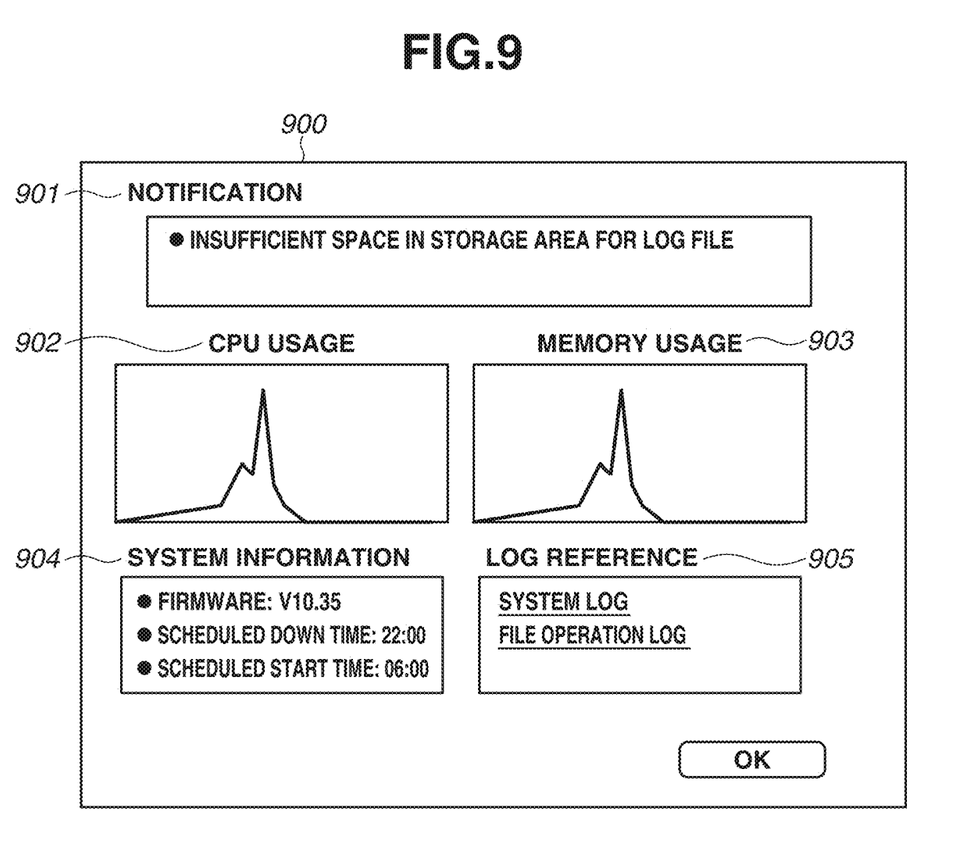
FIG. 9 illustrates an example of a management screen according to one or more aspects of the present disclosure.

FIG. 9 illustrates another form of the management screen 510 in FIG. 5B. A management screen 900 in FIG. 9 is provided as a web server function by the UI control unit 305 of the information processing apparatus 100 over a network.

The management screen 900 provides, in "notification" 901, "CPU usage" 902, "memory usage" 903, and "system information" 904, information similar to those in the "notification" 511, the "CPU usage" 512, the "memory usage" 513, and the "system information" 514 described above in conjunction with FIG. 5B.

In "log reference" 905, a link to log information output by the operation management unit 302 is arranged in accordance with the operation in step S407, step S607, or step S707 in the respective exemplary embodiments. In the present exemplary embodiment, in addition to the link for displaying a file operation log, a link for displaying a system log relating to the system is also displayed.

In a case where the administrator selects a link arranged in the "log reference" 905 using the input device 205, the contents of a shared folder and/or a log file that store(s) target log information are displayed. The administrator can also send this link by e-mail. The link may be displayed only on the management screen 900 as in the "log reference" 905 according to the present exemplary embodiment.

Other Embodiments

The present disclosure includes an apparatus or a system configured by appropriately combining the above-described exemplary embodiments and a method therefor.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Any exemplary embodiment of the present disclosure enables provision of a mechanism for more appropriately managing log information in an information processing apparatus with some conditions reflected, than in the related art.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-074227, filed Apr. 28, 2023, which is hereby incorporated by reference herein in its entirety.

What is claimed is:

1. An information processing apparatus comprising:
a storage device, wherein the storage device has a log storage area for storing, as log information, a history record of an operation log related to a file operation performed over a network on a file;
one or more memories storing instructions; and
one or more processors capable of executing the instructions causing the information processing apparatus to:
output a notification message in response to available space of the log storage area falling below a predetermined amount due to the log information stored in the storage device;
set a first setting for transferring the log information stored in the log storage area to an external log server over a network and a second setting for creating a link for referring to the log information stored in the log storage area;
in a case where the link creation is set to be enabled in the second setting, store, in the log storage area, a history record of a file operation as the log information; and
in a case where the link creation is set to be disabled in the second setting, store, in the log storage area, a history record of an operation log that the transferring has not been performed as the log information, without storing an operation log that the transferring has been performed in accordance with the first setting in the log storage area.

2. The information processing apparatus according to claim 1, wherein the instructions further cause the information processing apparatus to provide, in a case where the link creation is set to be enabled in the second setting, a screen including the link for referring to the log information stored in the log storage area.

3. The information processing apparatus according to claim 1, wherein the instructions further cause the information processing apparatus to provide a screen for a user to perform the first setting and the second setting over the network.

4. A method for controlling an information processing apparatus comprising a storage device, wherein the storage device has a log storage area for storing, as log information, a history record of an operation log related to a file operation performed over a network on a file, the method comprising:
setting a first setting for transferring the log information stored in the log storage area to an external log server over a network and a second setting for creating a link for referring to the log information stored in the log storage area;

in a case where the link creation is set to be enabled in the second setting, store, in the log storage area, a history record of a file operation as the log information; and in a case where the link creation is set to be disabled in the second setting, store, in the log storage area, a history record of an operation log that the transferring has not been performed as the log information, without storing an operation log that the transferring has been performed in accordance with the first setting in the log storage area.

5. A non-transitory computer readable storage medium on which is stored a computer program for making a computer execute a method for an information processing apparatus, the method comprising:

storing, as log information in a log storage area in a storage device of the information processing apparatus, a history record of an operation log related to a file operation performed over a network on a file;

setting a first setting for transferring the log information stored in the log storage area to an external log server over a network and a second setting for creating a link for referring to the log information stored in the log storage area; and in a case where the link creation is set to be enabled in the second setting, store, in the log storage area, a history record of a file operation as the log information; and in a case where the link creation is set to be disabled in the second setting, store, in the log storage area, a history record of an operation log that the transferring has not been performed as the log information, without storing an operation log that the transferring has been performed in accordance with the first setting in the log storage area.

6. The information processing apparatus according to claim 1, wherein the instructions further cause the information processing apparatus to output a notification message in response to available space of the log storage area falling below a predetermined amount due to the log information stored in the storage device.

* * * * *